United States Patent [19]

Bassett

[11] Patent Number: 5,479,992
[45] Date of Patent: Jan. 2, 1996

[54] AGRICULTURAL IMPLEMENT CONTROLLER TO COMPENSATE FOR SOIL HARDNESS VARIATION

[75] Inventor: James H. Bassett, Sycamore, Ill.

[73] Assignee: Dawn Equipment Company, Sycamore, Ill.

[21] Appl. No.: 97,978

[22] Filed: Jul. 27, 1993

[51] Int. Cl.⁶ ..................................... A01C 5/00
[52] U.S. Cl. .................................. 172/4; 172/2; 172/239; 111/134; 111/63; 73/84
[58] Field of Search ................... 172/76, 2, 3, 4, 172/4.5, 7, 9, 10, 239; 111/62, 63, 134; 73/84

[56] References Cited

U.S. PATENT DOCUMENTS

| | | | |
|---|---|---|---|
| 3,110,973 | 11/1963 | Reynolds | 72/239 X |
| 3,749,035 | 7/1973 | Cayton et al. | 172/4 X |
| 5,129,282 | 7/1992 | Bassett et al. | 74/529 |

FOREIGN PATENT DOCUMENTS 1108971  6/1961  Germany ........................ 172/239

*Primary Examiner*—Eric K. Nicholson
*Assistant Examiner*—Christopher J. Novosad
*Attorney, Agent, or Firm*—Arnold, White & Durkee

[57] ABSTRACT

An apparatus for generating a signal indicative of the hardness of soil. The apparatus has a frame to be moved relative to soil on which a hardness analysis is to be conducted and a sensing element mounted to the frame so that the sensing element engages soil relative to which the frame is moved and structure associated therewith generates a) a first signal as the sensing element encounters soil of a first hardness and b) a second signal as the sensing element encounters soil of a second hardness.

19 Claims, 4 Drawing Sheets

AGRICULTURAL IMPLEMENT CONTROLLER TO COMPENSATE FOR SOIL HARDNESS VARIATION

BACKGROUND OF THE INVENTION

1. Field of the Invention

This invention relates to agricultural implements and, more particularly, to an apparatus for sensing the hardness of subjacent soil and controlling downward pressure on agricultural implements in relation to the soil hardness to assure uniform depth of treatment with the implements.

2. Background Art

A primary objective of the agricultural industry is to optimize field productivity by producing a uniform crop yield throughout an entire field. Yield plotting and other types of field monitoring have allowed farmers to control the application of fertilizer, pesticides, etc. to maximize crop output. Even with the sophisticated monitoring that is presently carried out, the inconsistency in soil hardness has been a prevailing problem that causes a significant variation in crop quality and volume throughout a field.

Several factors contribute to the hardness of soil. For example, the amount and timing of rainfall are major factors in determining soil hardness. Changing of the nature of areas surrounding fields may alter drainage characteristics in the fields. Wind may relocate soil to change the field contour and the soil composition. All of these factors, and others, change the soil hardness from one year to the next and sometimes from one location to the next in the same field. Since most of these factors are unpredictable, it is impossible to prepare in advance for soil conditions that will exist during planting season. Whereas the above monitoring techniques have enabled farmers to compensate for some variables and thereby greatly increase production for a given field, no suitable structure is currently available to effectively compensate for variations in soil hardness.

Typically, agricultural implements are generically designed for a standard soil type. That is, the implements are weighted so that soil penetrating tools, such as fertilizer applicators, soil openers, etc. penetrate the soil a predetermined depth under the overall weight of the implement. A typical implement may weigh on the order of 300 pounds. In exceptionally soft soil, the tools on the implement penetrate a significantly greater amount than is desired, so that the wheels create unwanted trenches, while in particularly hard soil an inadequate amount of penetration of the tools may result. This results in inconsistent depth of seed and fertilizer placement, which may in turn result in significantly different crop quality and yield for different parts of a field.

It is known to produce a downward biasing force on implements to increase the penetrating depth of the tools thereon in harder soils and also to avoid uncontrolled bouncing of the implements, particularly when they are drawn over such harder soils. In one known system, a spring mechanism acts between a rigid carrying frame and a linkage, or other mounting part for the implement, to exert a downward force. Without the ability to vary this added downward force, the farmer solves the penetration problem only for the harder soils and aggravates the problem by causing excessive penetration in the softer soils.

In an attempt to overcome this problem, mechanisms have been devised to adjust spring position as to allow variation in the magnitude of the downward spring force. One such prior art system uses one fixed position spring and one variable position spring in association with each implement. This generally requires that the user manually set, one by one, the adjustable springs associated with each of the implements. Since a multitude of adjustments may actually be required over a given field, adjustment is a time consuming and very inconvenient exercise. As a result, the user may make a compromise adjustment that is adequate for the entire field yet which fails to optimize yield for the harder and softer soils.

To overcome the deficiencies in the last described system, it is known to use a pneumatic system to vary downward pressure on tools. This system requires a separate compressor to be operated by the towing vehicle. If multiple implements are to be simultaneously controlled, an impractically large holding tank would be required. It is inconvenient to have to provide a self-contained air compressing system, which takes up valuable space on the towing vehicle. Further, pneumatic cylinders are normally quite large and may interfere with an operator's access to the implements as may be required to effect adjustments or repairs thereto. In spite of this problem, one agricultural equipment manufacturer uses an air cylinder, such as used as a shock absorber on an automobile, to prevent implement bouncing and exert a downward force on the implements.

Another problem with this system is that the manner of detection of the soil hardness is deficient. The operator is required to "guess" at the hardness of the soil in front of the towing vehicle, based upon the physical appearance thereof and make a relatively crude adjustment in anticipation of encountering this soil. Alternatively, the operator can visually monitor the amount of penetration of the tools behind the towing vehicle and then make an adjustment. However, at this point, a significant amount of the soil will have been treated before the appropriate adjustment can be made. This also requires the constant attention of the operator whose attention is normally required for other important tasks.

While the above described deficiencies in the prior art have been recognized for a long time, for want of any better solution, these systems have generally been practiced and their shortcomings contended with.

SUMMARY OF THE INVENTION

The present invention is specifically directed to overcoming the above enumerated problems in a novel and simple manner.

According to the invention, an apparatus is provided for generating a signal indicative of the hardness of soil. The apparatus has a frame to be moved relative to soil on which a hardness analysis is to be conducted and a sensing element mounted to the frame so that the sensing element engages soil relative to which the frame is moved and structure associated therewith generates a) a first signal as the sensing element encounters soil of a first hardness and b) a second signal as the sensing element encounters soil of a second hardness.

In one form, the sensing element is a wheel that rolls along soil relative to which the frame is moved, with the wheel being mounted for movement relative to the frame between first and second positions. The wheel readily penetrates soft soil and assumes one of the first and second positions relative to the frame in that soft soil. The harder soil causes the wheel to assume the other of the first and second positions.

The invention also contemplates the combination of the above apparatus with a soil treating implement and a towing frame to which the implement is attached for relative vertical movement within a predetermined range wherein the implement has substantially the same orientation within the range. Structure acts between the towing frame and at least one of the soil treating implement and the structure for attaching the soil treating implement to the towing frame for exerting a variable vertical force on the soil treating implement in response to a signal generated through the sensing element.

Accordingly, with the sensing element sensing soft soil, the downward force on the soil treating implement is reduced so that it is not forced too deeply into the soil. On the other hand, when the harder soil is sensed, the downward force on the soil treating implement is increased to cause the soil treating implement to be pressed downwardly in the soil to a desired height. The system can be calibrated to cause the soil treating implement to maintain a consistent operating height as it is towed through a field, regardless of variations in the hardness of the soil.

In one form, the sensing element is mounted to the frame for pivoting movement about an axis, with the sensing element normally being biased in one rotational direction relative to the frame.

The frame can be provided with an arm depending in cantilever fashion to facilitate mounting of the sensing element thereto. One part of a link is connected to the arm for rotation about a first axis, with the sensing element being connected to the link at a second part thereof. The link is pivotable between first and second positions as an incident to which the different signals are developed that are indicative of different soil hardness.

In one form, an extensible member acts between the arm and the link. The extensible member may also bias the link towards one of the first and second positions therefor.

The inventive structure can be used to continuously record the signals generated through the sensing element to allow mapping of the hardness of soil for a given area to allow appropriate compensation to be made by the user. In one form, a receiver for the signal is provided and may be constructed to convert the signal to a meaningful form indicative of soil hardness.

In a preferred form of the invention, a gauging element is provided to define a reference position for soil hardness testing. The gauging element engages the soil and moves up and down to follow the contour of the terrain over which it moves. The different signals are generated from the different relative positions of the gauging element and sensing element.

The gauging element can take a number of different forms. It can be a rotatable drum, a wheel, a ski/skid, etc. It is preferred that it be wider than the sensing element so that the sensing element is more sensitive to changes in soil hardness than is the gauging element, which remains at substantially a uniform height on the subjacent soil over a range of different soil hardnesses.

Downward pressure on the gauging element can be varied. This can be done through use of a cylinder, the addition of weight in the event of a drum, or in a number of other different manners.

In one form, each of the sensing and gauging elements is connected to the frame through a link and each of the links is pivotable relative to the frame about an axis. The invention contemplates other than pivoting movement for each of the sensing and gauging elements. For example, the gauging elements could be movable in translation vertically, with the sensing element attached either to the frame or the gauging element to be movable in a translatory or arcuate path, as previously described.

Further, according to the invention, an apparatus is provided for generating a signal indicative of the hardness of subjacent soil in a field. The apparatus has a towing frame and a soil treating implement having a first frame attached to the towing frame for movement vertically relative thereto within a range. Sensing structure is provided on at least one of the first and towing frames for engaging the subjacent soil and generating a signal indicative of the hardness of subjacent soil as the one of the first and towing frames moves relative to subjacent soil.

Structure acts between the towing frame and soil treating implement for developing a variable downward force on the soil treating implement. The force developing structure responds to the signal from the sensing structure and causes a downward force to be developed on the soil treating implement.

The sensing element causes a first signal to be generated upon sensing soil with a first hardness and a second signal to be generated upon sensing soil with a second hardness that is greater than the first hardness. The first signal causes the force developing structure to develop a first force, while the second signal causes the force developing structure to develop a second force, with the first force being smaller than the second force.

In one form, the structure for attaching the soil treating implement includes a plurality of links that are each pivotably connected both to the soil treating implement and towing frame and the force developing structure acts between the towing frame and at least one of the links.

The force developing structure is, in one form, at least one of an hydraulic cylinder and a pneumatic cylinder.

DETAILED DESCRIPTION OF THE DRAWINGS

Figure 1:
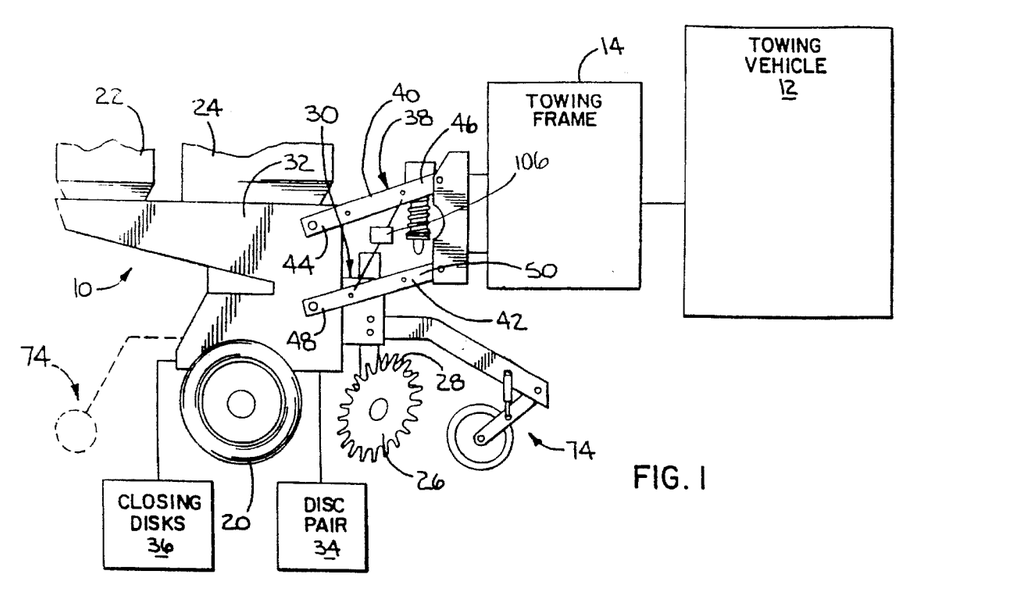
FIG. 1 is a schematic, side elevation view of a soil treating implement operatively connected to a towing vehicle and with the inventive structure incorporated therein so as to allow sensing of soil hardness and controlled vertical movement of the implement to compensate for variations in soil hardness.
Figures 2, 3:
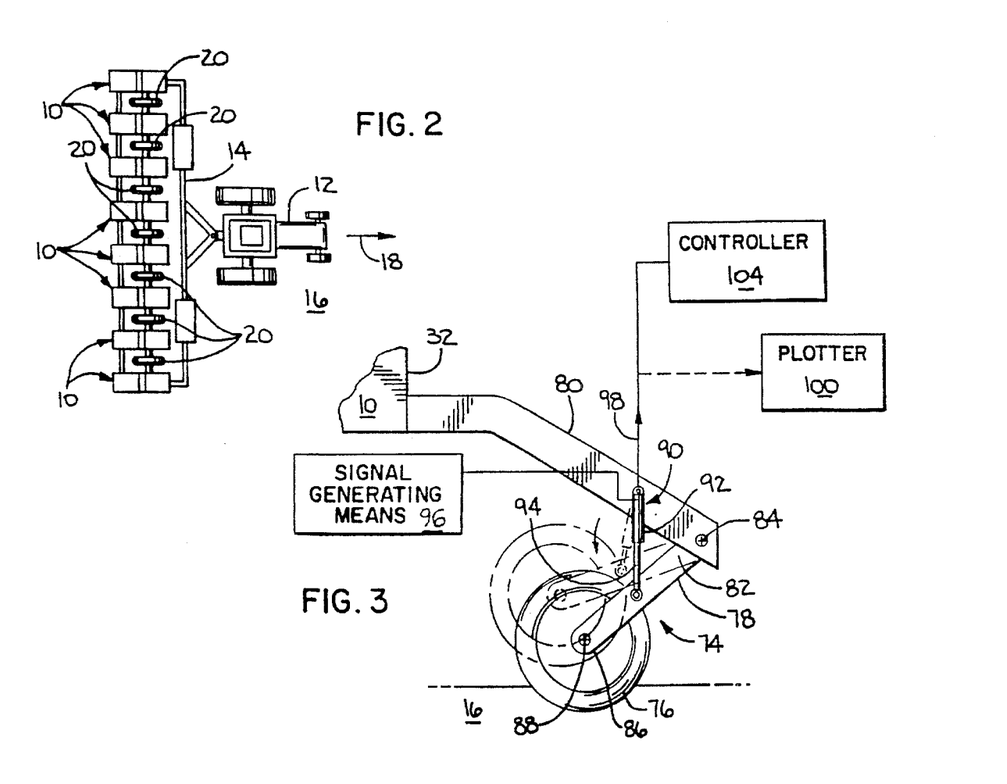
FIG. 2 is a schematic plan view of a towing vehicle operatively connected to a plurality of soil treating implements.
FIG. 3 is an enlarged side elevation view of a soil hardness sensing system on the inventive structure in FIG. 1.
Figure 4:
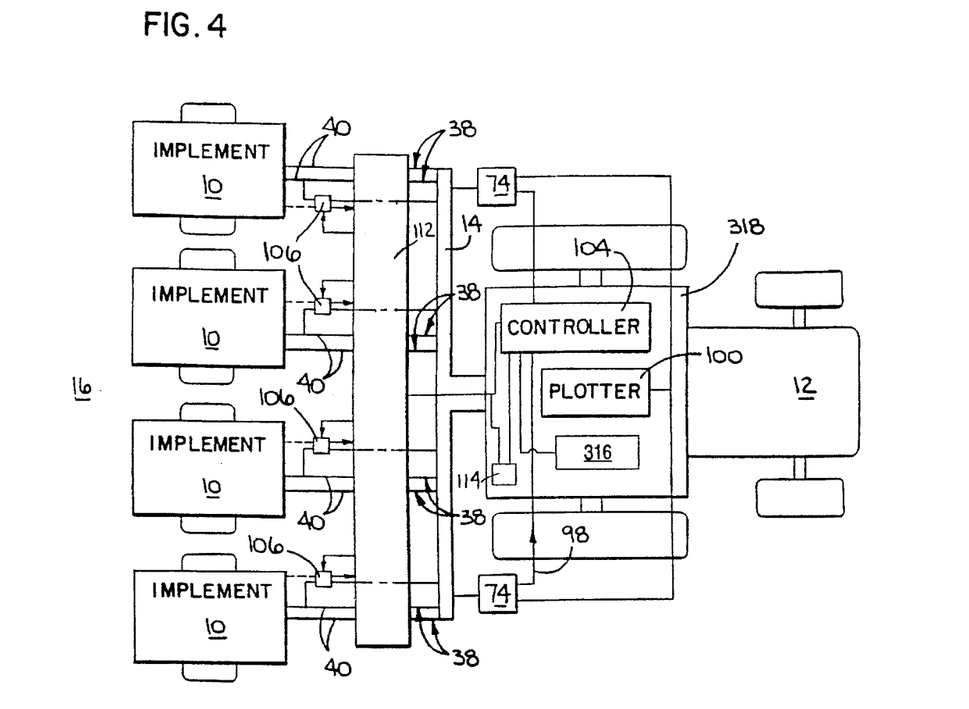
FIG. 4 is a schematic plan view of a towing vehicle operatively connected to a plurality of soil treating implements with the inventive structure incorporated therein.

In FIGS. 1 and 2, the environment for the present invention can be seen. Briefly, the invention is concerned with the connection between a soil treating implement 10 and a towing vehicle 12, which is a tractor, or the like. The tractor 12 is operatively connected to a towing frame 14 to which a plurality of the soil treating implements 10 can be attached in side-by-side relationship to simultaneously treat a substantial width of subjacent soil 16 as the tractor 12 advances in the direction of the arrow 18. The implements 10 have gauge wheels 20 thereon to facilitate travel of the implements 10 through a field.

The precise construction of the implements 10 does not form a part of the present invention. A wide range of implements to perform a multitude of tasks is currently available on the marketplace.

The exemplary implement 10 shown has bins 22, 24 to accommodate fertilizer and seed which are directed by gravity into the soil 16.

A pair of cooperating toothed wheels 26, 28 are mounted on the implement 10 upstream of the point of delivery of the fertilizer and seed from the bins 22, 24. The wheels 26, 28 are arranged in tandem for rotation about transverse axes. The wheels 26, 28 are driven by the underlying soil 16, as the implements 10 are advanced therethrough, and are in mesh to produce a scissors action that breaks up compacted soil and simultaneously clears residue out of the path of planting.

The wheels 26, 28 shown are a type currently sold by the assignee herein under the trademark TRASHWHEEL™. A more detailed explanation of the construction of the TRASHWHEEL™ tools, as well as suitable mounting structure therefor, is set out in my U.S. Pat. No. 5,129,282. Through a mechanism at 30, described more fully in U.S. Pat. No. 5,129,282, the wheels 26, 28 are vertically adjustable relative to a frame 32 on the implement 10.

Between the wheels 26, 28 and the gauge wheels 20, a disc pair, shown schematically at 34, and commonly referred to in the industry as a "V-opener", is provided to separate soil to provide a receptacle for seed. The discs in the disc pair 34 are inclined with respect to each other to produce a desired seed opening. The disc pair 34 is held at a fixed height on the implement 10 so that the depth of the opening defined by the disc pair 34 is determined by the vertical relationship between the disc pair 34 and the gauge wheels 20.

After the seed is introduced into the soil 16, closing discs 36, downstream of the gauge wheels 20, resituate soil over the opening created by the disc pair 34. The height of the closing discs 36 is fixed and also determined by the vertical relationship thereof to the wheels 20.

Consequently, the gauge wheels 20 determine the planting depth for the seed and the height of introduction of fertilizer, etc. The amount of penetration of the soil 16 by the wheels 20, and thus the planting depth, is determined primarily by the weight of the implement 10. The implement 10 is allowed to float vertically relative to the towing frame by connecting the implement 10 to the frame 14 through laterally spaced link pairs 38 (one pair shown). Conventionally, a four-bar linkage is used. The link pair 38 consists of an upper link 40 and a lower link 42. The link 40 has spaced ends 44, 46 pivotably connected to the implement 10 and towing frame 14 for rotation about horizontally extending, parallel axes. The link 42 has corresponding ends 48, 50 connected in like fashion. The links 40, 42 cooperatively define a parallel linkage which allows the implement to positively follow movement of the towing frame 14 while being movable vertically straight upwardly and downwardly within a limited range to follow the contour of the underlying terrain.

Since the implement 10 has a fixed weight, the amount of penetration of the soil 16 by the wheels 20 varies depending upon the hardness of the soil 16. Consequently, harder soil keeps the implement at a higher elevation than softer soil. The result of this is that the seed or fertilizer is introduced by the implement at different heights throughout a field depending upon the hardness of the soil. Even if the soil hardness does not vary, in some fields the soil is sufficiently hard that the implement 10 rides too high thereon so that the disc pair 34 defines too shallow a seed opening and, as a result, the seed is planted too close to the surface of the soil 16.

Figure 6:
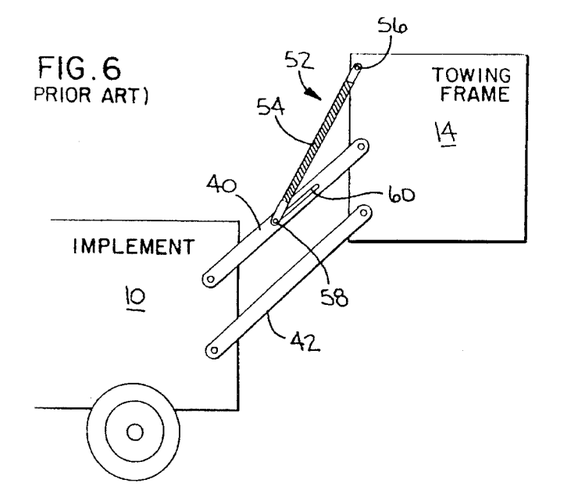
FIG. 6 is a side elevation view of a conventional connection between a soil treating implement and a frame on a towing vehicle with there being structure for biasing the implement downwardly relative to the frame.

Different structures have been developed in the prior art to attempt to overcome the above problem. One such structure is shown in FIG. 6. In FIG. 6, the implement 10 is shown schematically, as is the towing frame 14 which is used to draw the implement 10. The links 40, 42 are connected to the implement 10 and frame 14 in the same manner as shown in FIG. 1.

A biasing means 52 is provided to develop a downward force on the implement 10. The biasing means 52 acts between the links 40, 42 or the frame and link 40, in such a manner that a downward force component is developed to enhance the downward force attributable to the weight of the implement 10 and to prevent uncontrolled bouncing of the implement over irregular terrain. The biasing means 52 is shown in the form of a spring 54 with upper and lower end fittings 56, 58, respectively, pivotably connected to the frame 14 and implement 10.

A slot 60 is formed on the link 40 to allow lengthwise movement of the end fitting 58 relative to the link 40. This allows variation of the downward force component on the implement 10 attributable to the spring 54.

It should be understood that the description with respect to FIG. 6 is intended to be strictly schematic in nature. However, it does demonstrate the principles of the prior art structures. In one commercially available structure, one fixed spring acts between the frame 14 and one of the links 40, 42, whereas the other spring has the configuration shown in FIG. 6.

The difficulty with the structure in FIG. 6 is that the downward force on the implement 10 must be varied manually and, once set, is fixed. Consequently, if a user determines that soil in a field is harder than normal, the biasing means 52 must be set to produce an appropriate downward force on the implement 10. However, if soil is soft in certain parts of the field, the biasing means 52 forces the implement 10 too deeply into the soil causing the wheels 20 to trench and the seed and fertilizer to be placed too deeply.

Figure 5:
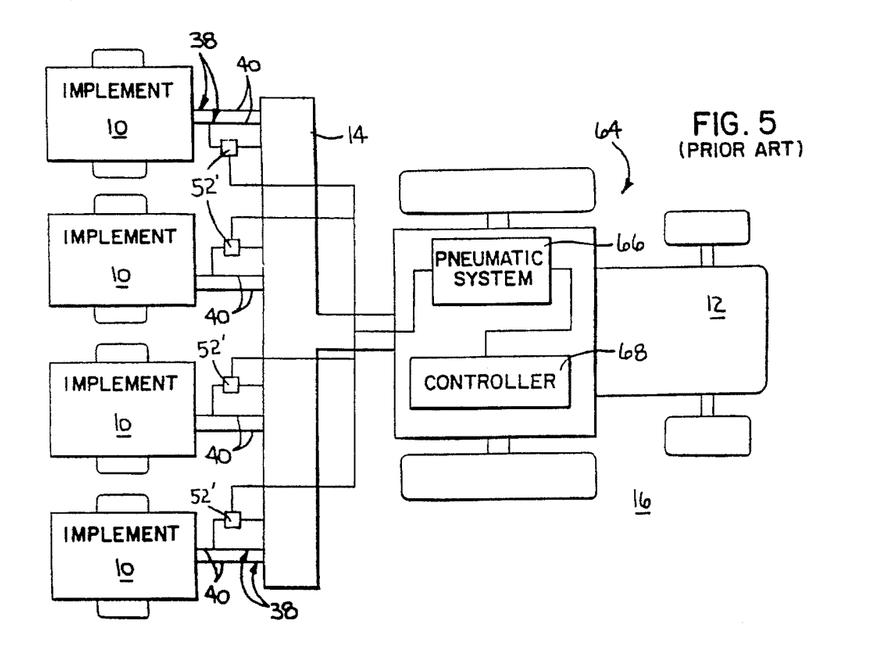
FIG. 5 is a schematic plan view of a towing vehicle operatively connected to a plurality of soil treating implements with a prior art system for varying the downward force on the soil treating implements.

One attempted solution to this problem is shown in the system at 64 in FIG. 5. The system 64 consists of a tractor 12 which is operatively connected to a towing frame 14 which in turn carries a plurality of implements 10. Laterally spaced link pairs 38 connect each implement to the frame as described with respect to the system in FIG. 1.

Biasing means 52' are provided, one each with an implement 10, and act either between the links 40, 42 or, as shown, between the towing frame 14 and one of the upper links 40 in the link pair 38.

In the prior art, the biasing means 52' is a pneumatic cylinder that requires a self-contained air compressing system 66 to be carried on, and operated by, the tractor 12. The biasing means 52' are simultaneously operated through a controller 68 to increase or decrease the downward force on the implements 10 through the biasing means 52', as appropriate.

There are several problems inherent in the system 64. First of all, the user must test the soil 16 and determine the amount of downward pressure that is optimum for the implements 10. This may involve trial and error. Since the control 68 therefor may be externally of the tractor 12 the user may have to repeatedly get out of a cab on the tractor 12 to carry out an inspection of the soil 16. The user sets the amount of downward pressure applied through the biasing means 52', works a portion of the field, and then must visually inspect the soil to make certain that the implements 10 penetrate the soil 16 a desired amount.

Another problem is that a pneumatic system 66 that is of a size to fit on a tractor 12 is usually inadequate to cause prompt response of the biasing means 52' to the operator's commands. This may result in a substantial portion of a field being treated improperly due to the slow response time for implement adjustment.

Still further, the pneumatic biasing means 52', which may each be in the form of an extensible cylinder, are required to be relatively large and may impair access to the implement 10 and frame 14 in the vicinity of the link pairs 38. This complicates repair and adjustment of parts that may periodically require attention.

The present invention solves the above problems. As seen in FIGS. 1, 3, 4, and 7, the present invention contemplates the use of a sensing means 74 to allow for continuous monitoring of the soil hardness as the tractor/towing vehicle 12 traverses a field and for generating a usable signal that is indicative of the soil hardness. The sensing means 74 has a sensing element, in this case a wheel 76, that engages the soil 16. The wheel 76 is carried on a link 78 which is in turn mounted to a depending, cantilevered arm 80 on the implement frame 32.

One end 82 of the link 78 is connected to the arm 80 for rotation about a horizontal axis 84. The other link end 86 supports the wheel 76 for rotation about a second axis 88, that is parallel to the axis 84. The link 76 is thus free to pivot in an arc within a predetermined range. As a result of this pivoting, the vertical position of the wheel 76 is variable, as between the solid line position in FIG. 3 and the phantom line position in the same figure.

The sensing means 74 includes a means 90 acting between the arm 80 and the link 78 that normally biases the wheel 76 towards a downward position, as shown in solid lines in FIG. 3. The biasing means 90 is in the form of a two-part cylinder with relative lengthwise movement between the parts 92, 94 altering the overall length of the biasing means 90. The biasing means 90 in turn has means 96 associated therewith for generating a signal that is indicative of the overall length of the biasing means 90, which in turn is indicative of the vertical position of the sensing wheel 76.

In operation, the biasing means 90 exerts a predetermined downward force on the wheel 76. This force is resisted by an upward force exerted by the soil attributable to the weight of the implement 10. The equilibrium position is shown in solid lines in FIG. 3. When softer soil is encountered, the biasing means 90 urges the link 78 in a counterclockwise direction about the axis 84 to lower the sensing wheel 76. This causes a first signal to be generated by the means 96. Harder soil causes the wheel to pivot the link 78 in a clockwise direction about the axis 84, thereby causing the means 96 to generate a different signal, indicative of a different vertical position of the wheel 76.

The signal 98 generated by the means 96 can be used for different purposes. For example, a plotter 100 can receive the signal 98 and continuously map the hardness of the entire field for future use. This allows the farmer to take appropriate steps to either alter the field conditions, through control of drainage, to vary the hardness, or the like, or to treat the hard and soft soil portions differently to maximize crop yield.

Figure 7:
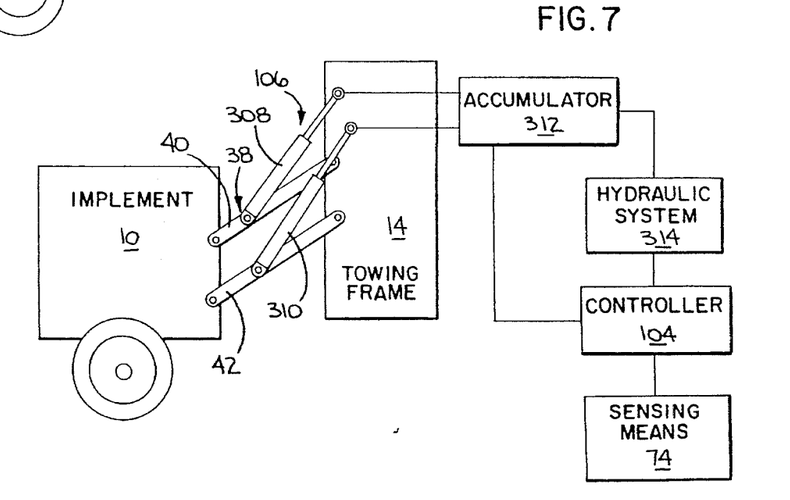
FIG. 7 is a view as in FIG. 6 incorporating the inventive structure for biasing the soil treating implement downwardly relative to a frame on a towing vehicle.

Alternatively, the signal 98 can be used to continuously alter the downward force of the implements 10 on the soil 16 as the soil hardness dictates. In this case, the signal 98 is received by an electrical controller 104 that is responsible for controlling operation of a means 106, acting either between the links 40, 42 (FIG. 1) or the frame 14 and one or both of the links 40, 42, for producing a variable force on the implements 10. The controller 104 is constructed so that in soft soil, a lesser force is caused to be exerted by the means 106 on the implement 10. More particularly, in soft soil, the wheel 76 penetrates the soil 16 a greater amount. That causes a first signal to be generated by the means 96 which is received by the controller which sends a command to the means 106 to reduce the downward force on the implements 10. In harder soil, the wheel 76 is caused to be elevated, which produces a second signal that is received by the controller 104 which thereby issues a command to increase the downward force applied by the means 106 to the implements 10.

With the inventive system, the soil condition is continuously and automatically monitored. The riding height of the implements 10 is automatically controlled so that seed and fertilizer are delivered to the soil at a uniform depth, regardless of variations in the hardness of soil throughout a field.

Figure 8:
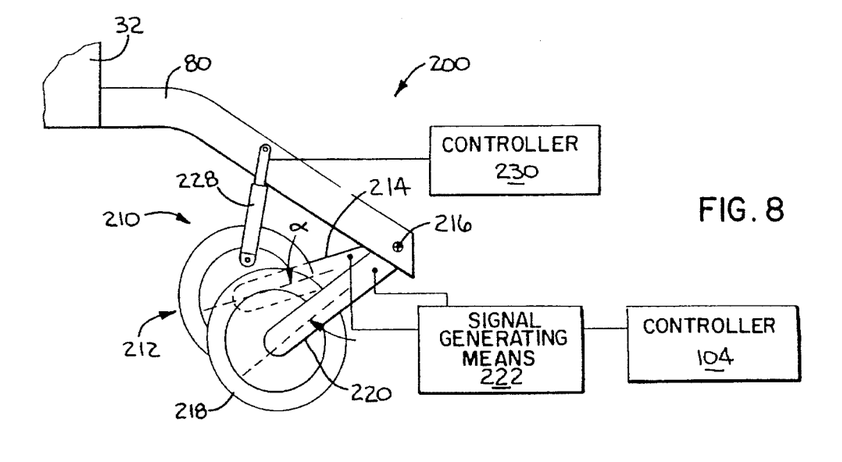
FIG. 8 is a side elevation view of a modified form of soil hardness sensing system, according to the present invention.
Figure 9:
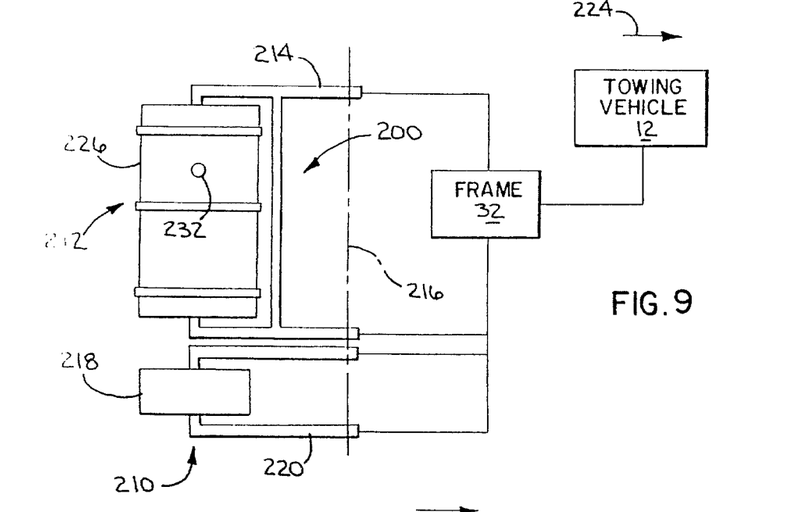
FIG. 9 is a plan view of the sensing system in FIG. 8.

In FIGS. 8 and 9, another, and more preferred sensing system, according to the present invention, is shown at 200 mounted on the arm 80 carried by the frame 32. A sensing means is shown at 210 for generating a signal, indicative of soil hardness, to be inputted to the controller 104, or elsewhere, as desired.

The sensing means 210 includes a gauging means 212 connected through a link 214 for pivoting movement relative to the frame arm 80. The link 214 is pivotable relative to the frame arm 80 about a laterally extending axis 216.

The sensing means 210 includes a sensing wheel 218 connected to the arm 80 through a link 220, which is pivotable relative to the link 80 about the axis 216. It should be understood that the axes of pivoting of the separate links 214, 220 could be other than coincident.

A means at 222 interconnects between the links 214, 220 and generates signals indicative of the relative positions of the links 214, 220. The relative positions of the links 214, 220 is directly related to the hardness of the soil, as explained more fully below.

More particularly, the gauging means 212 is constructed to give a frame of reference for soil hardness measurement. The gauging means 212 is made to have a substantial width transverse to the direction of travel of the towing vehicle 12, as indicated by the arrow 224 in FIG. 9. In FIGS. 8 and 9 the gauging means 212 is a drum 226 which is rolled over subjacent soil as the frame 32 is advanced relative thereto by the towing vehicle 12.

The sensing wheel 218 has a considerably narrower width than the drum 226 so that it penetrates the subjacent soil more readily than does the drum 226. As a consequence, the drum 226 remains in a substantially constant reference height on the subjacent soil. It will be maintained at a relatively constant height by hard soil and softer soil in that it will not significantly penetrate the latter due to its substantial contact area with the soil. By using the relative positions of the drum 226 and sensing wheel 218, a signal can be generated that is indicative of the soil hardness.

More particularly, the signal generated by the means 222 is indicative of the angle α between the links 214, 220. As the wheel 218 penetrates deeply into soil, the angle α increases so that a signal is generated by the means 222 to indicate the softer soil. A decreasing angle α is representative of a harder soil condition so that a signal is generated by the means 222 consistent with this.

To calibrate the inventive system 200 it may be desirable to increase the downward force on the drum 226. This may be accomplished by a cylinder 228 which is pneumatically or hydraulically operated through a controller 230. Alternatively, a fill opening 232 can be provided in the drum 226 to permit the introduction of a relatively heavy material, such as a fluid, sand, or the like.

Figure 10:
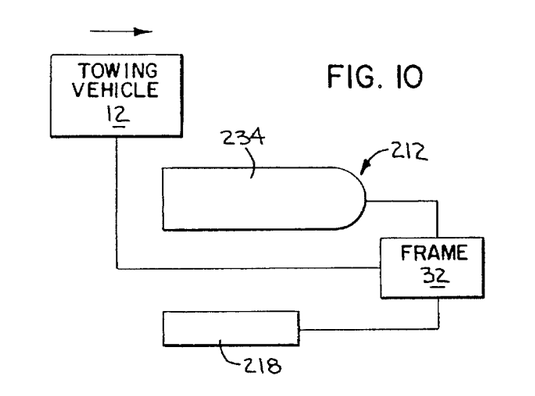
FIG. 10 is a schematic plan view of further modified form of soil hardness sensing system according to the present invention.

It should be understood that the use of a drum 226 is only exemplary of the many different types of gauging means 212 that can be used. It is not necessary that the gauging means 2 12 include any rotatable element. For example, as shown in FIG. 10, the gauging means 212 is shown as a skid/ski 234 with a width larger than that of the sensing wheel 218. The wheel 218 and skid/ski 234 are suitably supported by the frame 32 on the towing vehicle 12 for movement in a leading position, as shown in FIG. 10, or in a trailing position.

Figure 11:
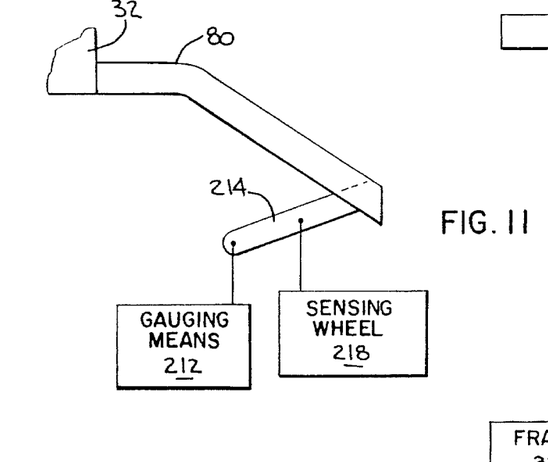
FIG. 11 is a schematic side elevation view of a further modified form of soil hardness sensing system, according to the present invention.

The invention further contemplates different mounting arrangements for the sensing means 210 and gauging means 212. For example, as described earlier with respect to in FIG. 11, the gauging means 212 is mounted to the link 214, as described earlier with respect to FIGS. 8 and 9. The sensing wheel 218 is shown attached to the link 214, rather than directly to the frame arm 80.

Figure 12:
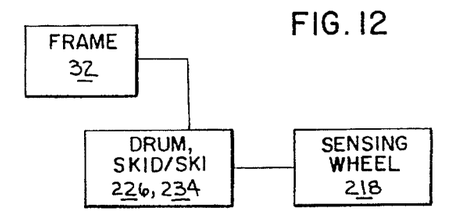
FIG. 12 is a schematic representation of a modified form of structure for connecting the inventive sensing system on a frame to be drawn by a towing vehicle.

In FIG. 12, a further modification is shown wherein the gauging drum 226 or skid/ski 234 is mounted to the frame 32 and the wheel 218 in turn mounted directly to the drum 226 or skid/ski 234.

As noted previously, the sensing wheel 218 can be replaced by a non-rolling structure that would function in like manner. The gauging means 212 and sensing means 210 can be provided, one or both, at a leading or trailing position with respect to the towing vehicle 12. The originally described sensing means are shown in FIG. 1 in a trailing position on the implement 10. Preferably, the sensing means 210 and gauging means 212 reside outside of the path of the tractor 12 to operate in soil that is not altered i.e. compressed, by the towing vehicle 12.

In still another aspect of the invention, a compressed fluid system, preferably hydraulically operated, is utilized to control the downward pressure on the implements 10. Hydraulic cylinders 308, 310 act between the frame 14 and the link pairs 38. The hydraulic cylinders 308 are relatively small so as to be unobtrusive. The cylinders 308 can be provided on one or both of the links 40, 42 in the link pair 38 and on one or both of the link pairs 38 associated with each implement 10.

To afford positive response to a signal 98 from the means 96 so as to thereby avoid improper planting, a fluid accumulator 312 is provided. The accumulator 312 is in communication with the hydraulic system 314 for the tractor 12. The controller 104 controls the accumulator 312 to actuate the cylinders 308, 310, to thereby produce the desired downward force on the implements 10. The accumulator 312 can be manually controlled by a valve 316 that is within the tractor cab 318 or at least readily accessible to the operator therefrom.

Since the soil hardness could vary along the width of the gang mounted implements 10, individual sensing means 74 can be provided in association with each implement 10 and the means 106 could be individually controlled for each implement to further optimize seed and fertilizer placement, as a result of which the field yield is maximized.

The foregoing disclosure of specific embodiments is intended to be illustrative of the broad concepts comprehended by the invention.

I claim:
1. An agricultural system comprising:
a frame to be moved relative to subjacent soil;
an implement;
means for mounting the implement to the frame in an operative position so that the implement is vertically movable relative to the frame and engageable with subjacent soil;
first means acting between the frame and implement for exerting a variable vertical force on the implement;
a sensing element;
means mounting the sensing element to the frame so that the sensing element engages soil relative to which the frame is moved; and
first means associated with the sensing element for generating a) a first signal as the sensing element encounters soil of a first hardness and b) a second signal as the sensing element encounters soil of a second hardness,
wherein the sensing element comprises a rotatable element that rolls along soil relative to which the frame is moved,
said mounting means for the rotatable element comprising means for mounting the rotatable element to the frame for vertical movement relative to the frame,
whereby upon encountering soil of different hardness the relative vertical position of the rotatable element and frame changes, said first means generating said first signal with the rotatable element in a first vertical position relative to the frame and generating said second signal with the rotatable element in a second vertical position relative to the frame, and
means responsive to a) said first signal for sending a command to said first means acting between the frame and the implement for producing a first vertical force on said implement and b) said second signal for sending a command to said first means acting between the frame and the implement for producing a second vertical force on said implement that is different from the first vertical force.
2. The agricultural system according to claim 1 wherein the means for mounting the implement to the frame mounts the implement for vertical movement within a range and the implement has substantially the same orientation within the range.

3. The agricultural system according to claim 1 wherein the mounting means for the sensing element mounts the sensing element to the frame for pivoting movement relative to the frame about an axis.

4. An apparatus for generating a signal indicative of the hardness of soil, said apparatus comprising:

a frame to be moved relative to soil on which a hardness analysis is to be made;

a sensing element;

means mounting the sensing element to the frame so that the sensing element engages soil relative to which the frame is moved; and first means associated with the sensing element for generating a) a first signal as the sensing element encounters soil of a first harness and b) a second signal as the sensing element encounters soil of a second hardness, wherein the sensing element comprises a wheel that rolls along soil relative to which the frame is moved, said mounting means comprising means for mounting the wheel to the frame for vertical movement relative to the frame, whereby upon encountering soil of different hardness the relative position of the wheel and frame changes, said first means generating said first signal with the wheel in a first vertical position relative to the frame and generating said second signal with the wheel in a second vertical position relative to the frame, wherein the mounting means mounts the sensing element to the frame for pivoting movement relative to the frame about an axis.

said apparatus further including means for normally biasing the sensing element in one rotational direction relative to the frame.

5. An apparatus for generating a signal indicative of the hardness of soil, said apparatus comprising:

a frame to be moved relative to soil on which a hardness analysis is to be made;

a sensing element;

means mounting the sensing element to the frame so that the sensing element engages soil relative to which the frame is moved; and first means associated with the sensing element for generating a) a first signal as the sensing element encounters soil of a first hardness and b) a second signal as the sensing element encounters soil of a second hardness, there further being means for receiving the signal from the first means and for continuously recording the signal to allow mapping of the hardness of soil for a selected area.

6. An apparatus for generating a signal indicative of the hardness of soil, said apparatus comprising:

a frame to be moved relative to soil on which a hardness analysis is to be made;

a sensing element;

means mounting the sensing element to the frame so that the sensing element engages soil relative to which the frame is moved;

first means associated with the sensing element for generating a) a first signal as the sensing element encounters soil of a first hardness and b) a second signal as the sensing element encounters soil of a second hardness, wherein the frame has an arm, the mounting means comprises a link and means for pivotably connecting one part of the link to the arm for rotation about a first axis and means for connecting the sensing element to the link at a second part of the link, wherein the link is pivotable between first and second positions, said first means generating said first signal with the link in the first position and said second signal with the link in the second position; and means for exerting a rotative force on the link for rotation of said link about said first axis.

7. An apparatus for generating a signal indicative of the hardness of soil, said apparatus comprising:

a frame to be moved relative to soil on which a hardness analysis is to be made;

a sensing element;

means mounting the sensing element to the frame so that the sensing element engages soil relative to which the frame is moved; and first means associated with the sensing element for generating a) a first signal as the sensing element encounters soil of a first hardness and b) a second signal as the sensing element encounters soil of a second hardness, wherein the frame has an arm, the mounting means comprises a link and means for pivotably connecting one part of the link to the arm for rotation about a first axis and means for connecting the sensing element to the link at a second part of the link, wherein the link is pivotable relative to the frame between first and second positions, said first means generating said first signal with the link in the first position and said second signal with the link in the second position, wherein the sensing means includes an extensible member acting between the arm and the link.

8. The apparatus for generating a signal indicative of the hardness of soil according to claim 7 wherein the extensible member includes means for normally biasing the link towards one of the first and second positions therefor.

9. An apparatus for generating a signal indicative of the hardness of soil, said apparatus comprising:

a frame to be moved relative to soil on which a hardness analysis is to be made;

a rotatable sensing element that can be rolled over subjacent soil;

means mounting the sensing element to the frame so that the sensing element engages soil relative to which the frame is moved;

first means associated with the sensing element for generating a) a first signal as the sensing element encounters soil of a first hardness and b) a second signal as the sensing element encounters soil of a second hardness, there further being a gauging element and means for mounting the gauging element to the frame, said sensing element and gauging element assuming a) a first relative position with the gauging element and sensing element engaging soil of a first hardness so that the first means generates said first signal and b) a second relative position with the gauging element and sensing element engaging soil of a second hardness so that the first means generates said second signal.

10. An apparatus for generating a signal indicative of the hardness of soil, said apparatus comprising:

a frame to be moved relative to soil on which a hardness analysis is to be made;

a sensing element;

means mounting the sensing element to the frame so that the sensing element engages soil relative to which the frame is moved; and first means associated with the sensing element for generating a) a first signal as the sensing element encounters soil of a first hardness and b) a second signal as the sensing element encounters soil of a second hardness, there further being a gauging element and means for mounting the gauging element to the frame, said sensing element and gauging element assuming a) a first relative position with the gauging element and sensing element engaging soil of a first hardness so that the first means generates said first signal and b) a second relative position with the gauging element and sensing element engaging soil of a second hardness so that the first means generates said second signal, wherein the gauging element is one of a rotatable drum, a wheel, and a ski/skid, wherein each of the gauging element and sensing element has a width transverse to the direction of movement of the frame and the gauging element is wider than the sensing element.

11. An apparatus for generating a signal indicative of the hardness of soil, said apparatus comprising:

a frame to be moved relative to soil on which a hardness analysis is to be made;

a sensing element;

means mounting the sensing element to the frame so that the sensing element engages soil relative to which the frame is moved; and first means associated with the sensing element for generating a) a first signal as the sensing element encounters soil of a first hardness and b) a second signal as the sensing element encounters soil of a second hardness, there further being a gauging element and means for mounting the gauging element to the frame, said sensing element and gauging element assuming a) a first relative position with the gauging element and sensing element engaging soil of a first hardness so that the first means generates said first signal and b) a second relative position with the gauging element and sensing element engaging soil of a second hardness so that the first means generates said second signal, wherein each of the sensing element and gauging element is connected to the frame through a link and each of the links is pivotable relative to the frame about an axis.

12. An apparatus for generating a signal indicative of the hardness of subjacent soil, said apparatus comprising:

a soil treating implement having a first frame;

a towing frame;

means for attaching the soil treating implement to the towing frame for movement of the soil treating implement vertically relative to the towing frame within a range;

sensing means on at least one of the first and towing frames including a sensing element for engaging subjacent soil as the one of the first and towing frames moves relative to subjacent soil, a gauging element;

means for mounting the gauging element to at least one of the first and towing frames so that the gauging element engages subjacent soil; and means for generating a first signal as an incident of the gauging element and sensing element being in a first relative position on that is indicative of a first soil hardness and a second signal as an incident of the gauging element and sensing element being in a second relative position that is indicative of a second soil hardness, wherein at least one of the sensing and gauging elements is a rotatable element that can roll over subjacent soil.

further wherein the sensing means includes a sensing element that rolls along subjacent soil relative to which the frame is moved.

13. The apparatus for generating a signal indicative of the hardness of soil according to claim 12 including means acting between the towing frame and soil treating implement for developing a variable vertical force on the soil treating implement, there being means on the force developing means responsive to the signal from the signal generating means for causing a vertical force to be developed by the force developing means on the soil treating implement.

14. The apparatus for generating a signal indicative of the hardness of soil according to claim 13 wherein the sensing means generates a first signal upon sensing soil with a first hardness and a second signal upon sensing soil with a second hardness that is greater than the first hardness, said first signal causing the force developing means to develop a first force, said second signal causing the force developing means to develop a second force, said first force being smaller than the second force.

15. The apparatus for generating a signal indicative of the hardness of soil according to claim 13 wherein the force developing means comprises at least one of an hydraulic cylinder and a pneumatic cylinder.

16. An apparatus for generating a signal indicative of the hardness of subjacent soil in a field, said apparatus comprising:

a soil treating implement having a first frame;

a towing frame;

means for attaching the soil treating implement to the towing frame for movement of the soil treating implement vertically relative to the towing frame within a range; and sensing means on at least one of the first and towing flames for engaging subjacent soil and generating a signal indicative of the hardness of subjacent soil as the one of the first and towing flames moves relative to subjacent soil, there further being means for receiving the signal from the sensing means and for continuously recording the signal to allow mapping of the hardness of soil for a given area.

17. An apparatus for generating a signal indicative of the hardness of subjacent soil in a field, said apparatus comprising:

a soil treating implement having a first frame;

a towing frame;

means for attaching the soil treating implement to the towing frame for movement of the soil treating implement vertically relative to the towing frame within a range; and sensing means on at least one of the first and towing frames for engaging subjacent soil and generating a signal indicative of the hardness of subjacent soil as the one of the first and towing frames moves relative to subjacent soil, wherein the sensing means includes a sensing element that rolls along subjacent soil relative to which the frame is moved, said apparatus further including means acting between the towing frame and soil treating implement for developing a variable vertical force on the soil treating implement, there being means on the force developing means responsive to the signal from the signal generating means for causing a vertical force to be developed by the force developing means on the soil treating implement, wherein the means for attaching the soil treating implement comprises a plurality of links that are each pivotably connected to the soil treating implements and towing frame and the force developing means acts between the towing frame and at least one of the links.

18. An apparatus for generating a signal indicative of the hardness of soil, said apparatus comprising:

a frame to be moved relative to subjacent soil on which a hardness analysis is to be made;

a sensing element;

means mounting the sensing element to the frame so that the sensing element engages subjacent soil relative to which the frame is moved; and first means associated with the sensing element for generating a) a first signal as the sensing element encounters soil of a first hardness and b) a second signal as the sensing element encounters soil of a second hardness, there further being a gauging element and means for mounting the gauging element to the frame, said sensing element and gauging element assuming a) a first relative position with the gauging element and sensing element engaging soil of a first hardness so that the first means generates said first signal and b) a second relative position with the gauging element and sensing element engaging soil of a second hardness so that the first means generates said second signal, wherein the means for mounting the gauging element to the frame comprises means for mounting the gauging element for movement vertically relative to the frame.

19. The apparatus for generating a signal indicative of the hardness of soil according to claim 18 wherein there are means for varying downward pressure of the gauging element on soil relative to which the frame is moved.

* * * * *